(12) United States Patent
Cairns (10) Patent No.: US 9,686,922 B2
(45) Date of Patent: Jun. 27, 2017

(54) STUMP GRINDER CUTTING SYSTEM

(76) Inventor: Keith Cairns, Olympia, WA (US)

( * ) Notice: Subject to any disclaimer, the term of this patent is extended or adjusted under 35 U.S.C. 154(b) by 625 days.

(21) Appl. No.: 13/474,937

(22) Filed: May 18, 2012

(65) Prior Publication Data

US 2013/0306775 A1    Nov. 21, 2013

(51) Int. Cl.
*A01G 23/06* (2006.01)

(52) U.S. Cl.
CPC ........... *A01G 23/067* (2013.01); *A01G 23/06* (2013.01)

(58) Field of Classification Search
CPC ...... A01G 23/06; A01G 23/067; B27G 13/04; B27G 13/08; B27G 13/10
USPC ..... 144/24.12, 218, 230; 407/35, 46, 47, 67, 407/101, 102
See application file for complete search history.

(56) References Cited

U.S. PATENT DOCUMENTS

| | | | | |
|---|---|---|---|---|
| 830,778 A * | 9/1906 | Geer | ............................... | 407/49 |
| 1,037,146 A * | 8/1912 | Hunter | ........................... | 83/836 |
| 3,213,716 A * | 10/1965 | Getts | ....................... | B23B 29/03 408/229 |
| 3,336,958 A | 8/1967 | Carlton | | |
| 3,973,307 A * | 8/1976 | McCreery | ............. | B23B 27/145 407/114 |
| 4,222,298 A * | 9/1980 | James | .................. | B23D 61/021 144/218 |
| 4,492,140 A * | 1/1985 | Pano | ............................... | 83/839 |
| 4,998,574 A | 3/1991 | Beach et al. | | |
| 5,078,219 A * | 1/1992 | Morrell | .................... | B28D 1/12 299/111 |
| 5,211,212 A * | 5/1993 | Carlson et al. | ............... | 144/241 |
| 5,365,986 A | 11/1994 | Hooser | | |
| 5,743,314 A | 4/1998 | Puch | | |
| 6,024,143 A | 2/2000 | Ritchey | | |
| 6,138,725 A | 10/2000 | Leonardi et al. | | |
| D433,428 S | 11/2000 | Pullen | | |
| 6,299,389 B1 * | 10/2001 | Barazani | ........................ | 407/110 |
| 6,325,574 B1 * | 12/2001 | Treige | .............................. | 407/35 |
| D457,172 S | 5/2002 | Bautz et al. | | |
| 6,484,766 B1 | 11/2002 | Falatok et al. | | |
| 7,124,795 B2 | 10/2006 | Kammerer | | |
| 7,241,082 B2 * | 7/2007 | Smilovici | ............. | B23C 5/2221 407/113 |
| 7,418,986 B2 | 9/2008 | Watts | | |
| 8,534,330 B2 * | 9/2013 | Hinchliff | ........................ | 144/230 |
| 8,789,566 B2 * | 7/2014 | Leonardi et al. | ............. | 144/176 |
| 2007/0079900 A1 | 4/2007 | Stager et al. | | |
| 2008/0099103 A1 * | 5/2008 | Leonardi | .............. | A01G 23/067 144/24.12 |
| 2009/0159155 A1 | 6/2009 | Watts | | |
| 2010/0043922 A1 * | 2/2010 | Leonardi et al. | ............. | 144/235 |

(Continued)

*Primary Examiner* — Matthew G Katcoff
(74) *Attorney, Agent, or Firm* — Janeway Patent Law PLLC (57) ABSTRACT

Embodiments provide a cutting system for the stump grinder including a cutting assembly configured to be coupled to a wheel on the stump grinder. The cutting assembly may include a mounting block and a cutting block. The mounting block may be disposed in a pocket of the wheel that extends inward from a circumferential outer edge of the wheel. The cutting block may be coupled to the mounting block. The cutting block may have a continuous cutting edge that extends from a first side of the wheel to a second side of the wheel around a circumferential outer edge of the wheel.

8 Claims, 10 Drawing Sheets

(56) References Cited

U.S. PATENT DOCUMENTS

2010/0090047 A1* 4/2010 Willibald ............... A01B 33/08
                                                          241/292.1
2010/0193079 A1   8/2010  Gossett
2011/0100508 A1   5/2011  Fraley et al.
2012/0024425 A1   2/2012  Leonardi et al.
2014/0027017 A1*  1/2014  Green et al. ................. 144/228

* cited by examiner

STUMP GRINDER CUTTING SYSTEM

TECHNICAL FIELD

Embodiments herein relate to the field of stump grinders, and more specifically to cutting systems for stump grinders.

BACKGROUND

Stump grinders typically include a rotating wheel with a cutting assembly coupled to the wheel. The cutting assembly includes a cutting element which cuts a workpiece, such as a stump, as the wheel rotates. However, stump grinders require different cutting assemblies for plunging (downward) cuts and for sweeping (sideways) cuts. Additionally, replacing the cutting element and/or cutting assembly can be difficult and time consuming.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for a stump grinder are provided. Embodiments provide a cutting system for the stump grinder including a cutting assembly configured to be coupled to a wheel on the stump grinder. The cutting assembly may include a mounting block and a cutting block. The cutting block may have a continuous cutting edge that extends from a first side of the wheel to a second side of the wheel around a circumferential outer edge of the wheel. The cutting edge may allow cutting in a plurality of axes simultaneously and/or with the same cutting edge. For example, the cutting edge may be used for cutting a workpiece (e.g., a stump) in three axes: plunging downward (e.g., perpendicular to the ground), sweeping sideways, and/or radially cutting forwards.

In various embodiments, the wheel may be generally disc-shaped with an outer edge and a mounting hole in the center about which the wheel is rotated. The outer edge may resemble any suitable shape, such as an ellipse (e.g., an oval and/or circle), a polygon, and/or another suitable shape. The wheel may further include a plurality of pockets extending inward from the outer edge for receiving the cutting tooth assemblies. A cutting-tooth assembly may be disposed in each pocket. The wheel may be generally oriented vertically (e.g., perpendicular to the ground) during operation of the stump grinder.

In various embodiments, the mounting block may be coupled to the wheel and disposed in the pocket of the wheel. The cutting block may be coupled to the mounting block. In some embodiments, the cutting block may be a separate component from the mounting block and may be releasably coupled to the mounting block, such as by one or more bolts. In other embodiments, the cutting block and mounting block may be integrated into a unitary piece. For example, the cutting block and mounting block may be formed of a single construction or multiple constructions permanently coupled together.

The cutting block may include a cutting edge that is oriented in the direction of rotation of the wheel. The cutting edge may be continuous and may extend from a first side of the wheel to a second side of the wheel around the circumferential outer edge. Accordingly, the cutting edge may be used for cutting a workpiece (e.g., a stump) in three axes: plunging downward (e.g., perpendicular to the ground), sweeping sideways, and/or radially cutting forwards. The cutting edge may be used to cut in a plurality of the three axes simultaneously. The cutting edge may be relatively smooth and/or may be serrated or include other structural features.

In various embodiments, the cutting edge may be oblong (e.g., may have a length in the radial direction that is longer than a width in the axial direction). For example, the cutting edge may include a rounded portion that crosses over a wheel plane (e.g., a plane that bisects a first side surface and a second side surface of the wheel), and straight portions on either side of the rounded portion (e.g., on the first and second sides of the wheel). The oblong shape of the cutting edge may facilitate an increased depth of cut in the radial direction (for plunging and/or radial cuts) and/or increased length of the cutting edge on the sides of the wheel (e.g., for sweeping cuts). In other embodiments, the cutting edge may have any suitable shape, such as substantially circular (e.g., a semi-circle) and/or elliptical.

In various embodiments, the cutting edge may extend a radial extension distance from the circumferential outer edge of the wheel. The radial extension distance may provide depth of cut in the radial direction for plunging (downward) and/or radial (forward) cuts. Additionally, the cutting edge may extend an axial extension distance from the side surfaces of the wheel. The axial extension distance may provide depth of cut in the axial direction for sweeping (sideways) cuts. In some embodiments, the radial extension distance may be longer than the axial extension distance. For example, the radial extension distance may be about 0.5 inches to about 3 inches, such as about 1 inch, and the axial extension distance may be about 0.1 inches to about 1 inch, such as about 0.25 inches.

In various embodiments, the mounting block may be releasably coupled to the wheel, such as by one or more bolts. In some embodiments, a nut may be disposed in the pocket of the wheel for receiving the bolt. In some embodiments, the nut may be a removable component. In these embodiments, the nut may be discarded if it becomes worn, and may be replaced with a new nut. In other embodiments, the nut may be integrated into the wheel. The nut may include a threaded portion to which the bolt couples.

In some embodiments, the pocket may include a bulbous bottom portion that is wider than an adjacent upper portion. The nut may be disposed in the bulbous bottom portion of the pocket. For example, the nut may be placed in the bulbous bottom portion from the side (e.g., axially). The bolt may then extend through the mounting block and couple the block to the nut. The bulbous bottom portion may prevent the nut from moving radially out of the pocket. The cutting tooth assembly (e.g., the mounting block and/or cutting element) may include a lip that extends over the nut to prevent the nut from sliding axially out of the pocket.

In various embodiments, the upper portion of the pocket may include a first wall and a second wall. In some embodiments, the upper portion may be tapered so that a first width of the upper portion adjacent the base portion is less than a second width of the upper portion at the outer edge of the wheel.

In some embodiments, the cutting block may be configured to be removable from the mounting block while the mounting block is disposed in the pocket and coupled to the wheel. For example, the mounting block may extend from the first wall to the second wall of the pocket. The mounting block may have a first slot that engages the first wall of the pocket and a second slot that engages the second slot of the pocket. The cutting block may be coupled to the mounting block outside the pocket, for example by one or more bolts as discussed above. Accordingly, the cutting block may be replaced quickly and easily with a single tool. This may allow the user to replace the cutting block when at the job site.

In other embodiments, the cutting block may extend into the pocket. For example, the mounting block may be disposed against the first wall of the pocket and the cutting block may be disposed against the second wall of the pocket. In some embodiments, the cutting block may be coupled to the mounting block in a readily releasable manner so that the cutting block and mounting block may be separated by pulling them apart when they are removed from the pocket. For example, the mounting block may include a peg that is disposed in a receiving hole of the cutting block (or vice versa). Alternatively, the cutting block may be coupled to the mounting block by other means, such as one or more bolts.

In some embodiments, the cutting block may include a cutting element coupled to a backing plate. The cutting element may include the cutting edge. In some embodiments, the cutting element may be releasably coupled to the backing plate, so that the cutting element may be replaced if it becomes worn.

In various embodiments, the cutting edge may be sharpened for continued use. The arrangement of the cutting edge described herein may allow the cutting edge to be sharpened while the cutting block is coupled to the mounting block and/or the wheel. For example, the cutting edge may be sharpened by grinding on an outside edge of the cutting element.

Figure 1A:
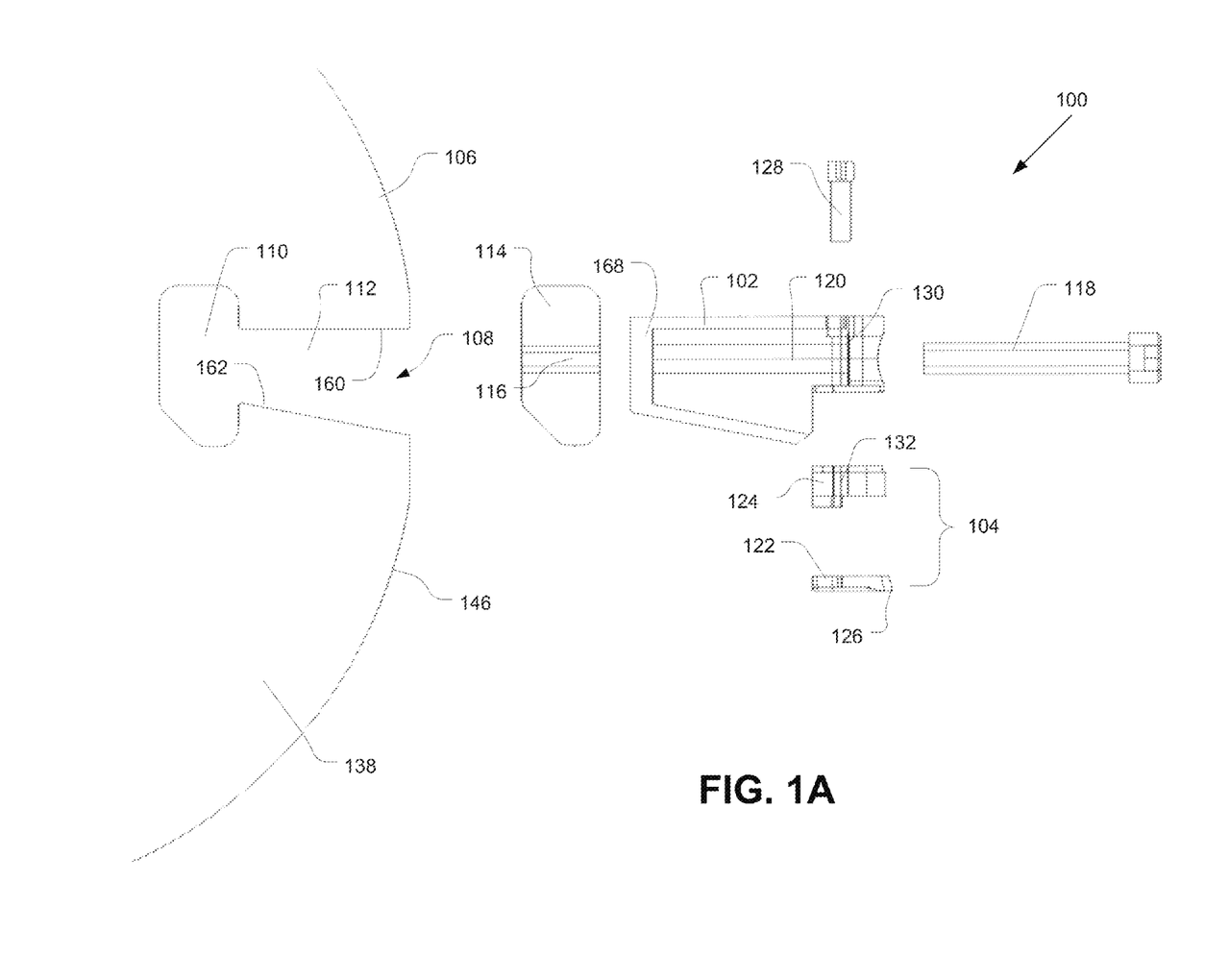
FIG. 1A is an exploded view of a stump grinder cutting system including a mounting block, a cutting block, and a wheel, in accordance with various embodiments.
Figure 1B:
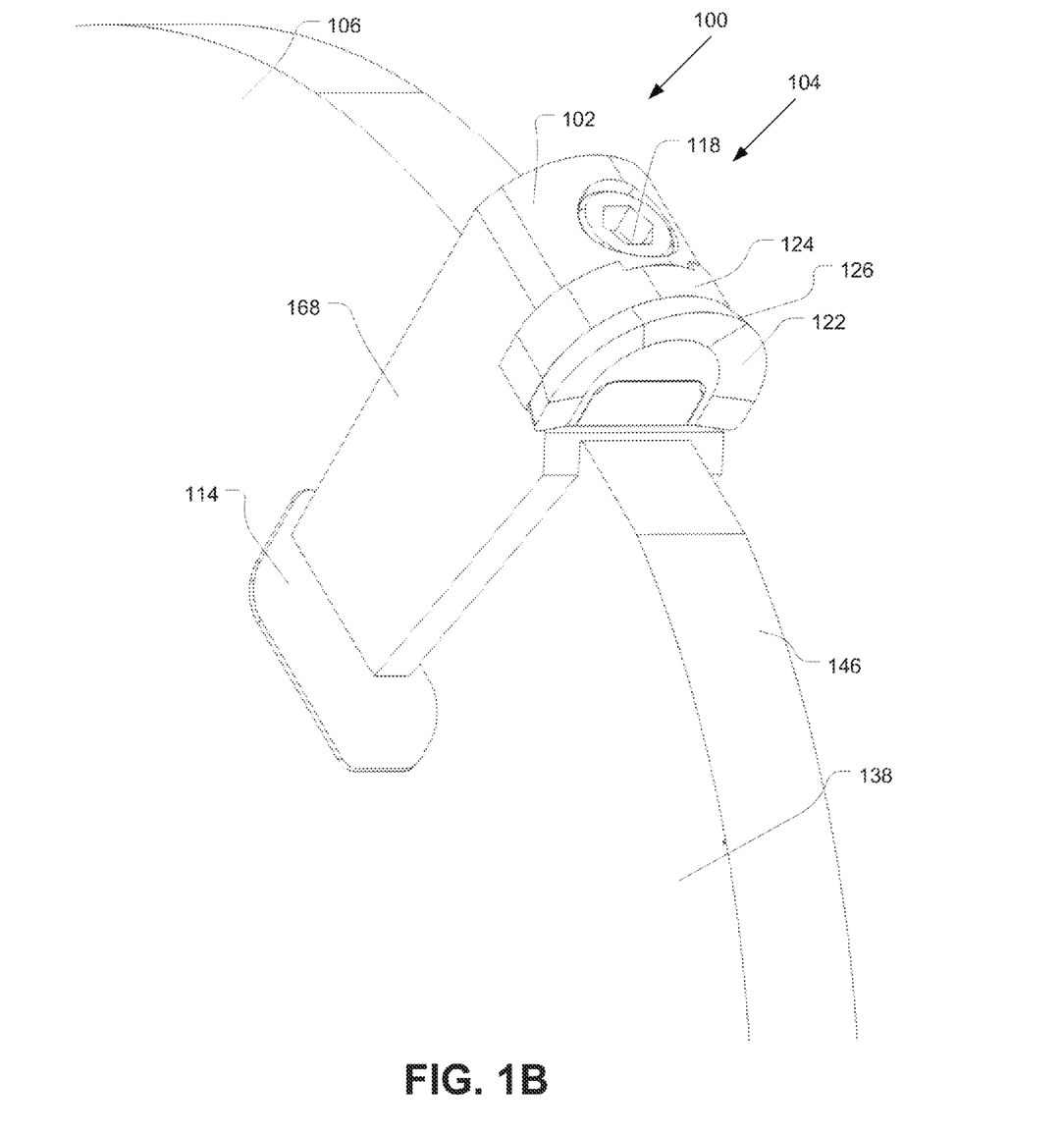
FIG. 1B is an assembled view a stump grinder cutting system in accordance with various embodiments.
Figure 2A:
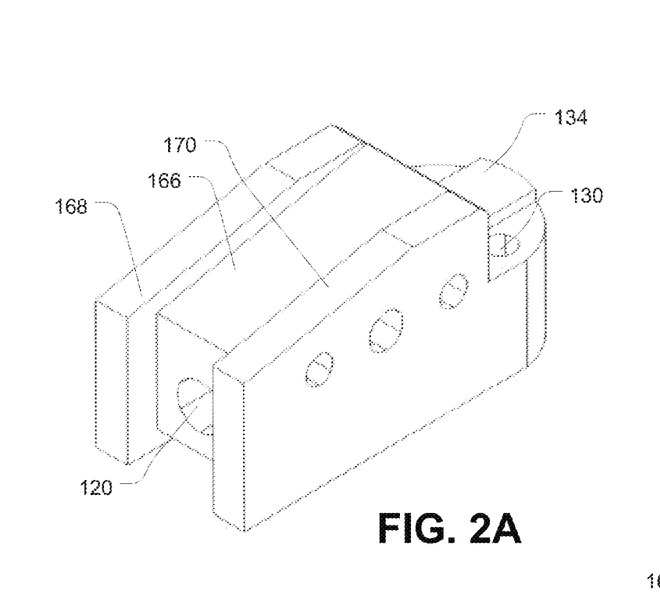
FIGS. 2A-2D illustrate various views of a mounting block in accordance with various embodiments, including: (A) a perspective view, (B) a top view, (C) a front view, and (D) a side view showing some internal structure.
Figure 2B:
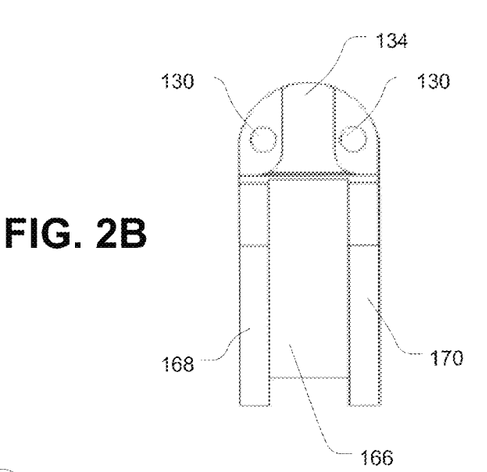
Figure 2C:
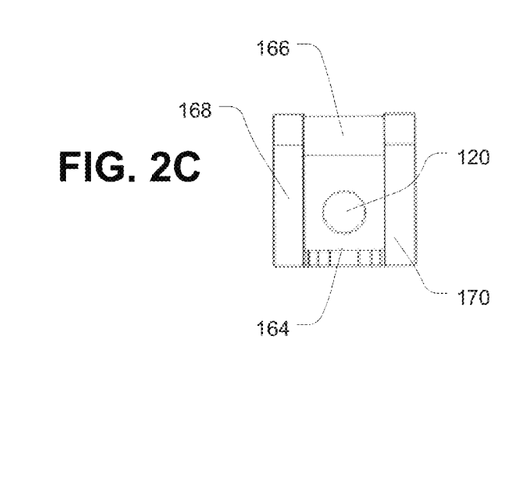
Figure 2D:
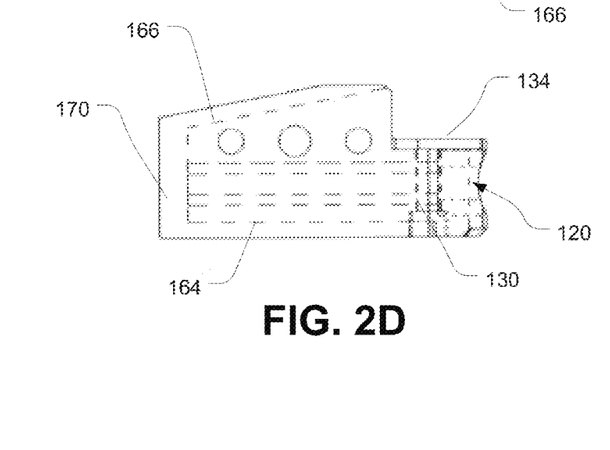

FIG. 1A illustrates an exploded view of a cutting system 100, and also shows some internal structure of the components of cutting system 100. FIG. 1B illustrates an assembled view of the cutting system 100. Cutting system 100 includes a mounting block 102 and a cutting block 104. The cutting block 104 is coupled to a wheel 106 that is rotated by a stump grinder (not shown). Additional views of the mounting block 102 are shown in FIGS. 2A-2D, additional views of the cutting block 104 are shown in FIGS. 3A-3D, and additional views of the wheel 106 are shown in FIGS. 4A-4B.

The wheel 106 includes a pocket 108 with a bulbous bottom portion 110 and a tapered upper portion 112. A nut 114 is placed in the bulbous bottom portion 110 and includes a threaded receiving hole 116. The bulbous bottom portion 110 is wider than the tapered upper portion 112 where the two portions meet, thereby preventing the nut 114 from moving radially out of pocket 108. The mounting block 102 is placed in the upper portion 112 of the pocket 108 and secured to the nut 114 (and thereby to the wheel 106) by a bolt 118. Bolt 118 extends through a radial through-hole 120 in mounting block 102.

The cutting block 104 includes a cutting element 122 coupled to a backing plate 124. The cutting element 122 forms a cutting edge 126. In some embodiments, cutting element 122 may be permanently or semi-permanently coupled to the backing plate 124. By semi-permanently, it is meant that the cutting element 122 may be secured to the backing plate 124 in such a manner that the cutting element 122 may remain coupled to the backing plate 124 for an extended period of time but may be removed if subjected to a removal process. For example, the cutting element 122 may be soldered to the backing plate 124. The soldering may permanently or semi-permanently secure the cutting element 122 to the backing plate 124. However, in some embodiments, the cutting element 122 may be removed by, for example, subjecting the solder to heat. In other embodiments, the cutting element 122 may be releasably coupled to the backing plate 124, such as by one or more bolts/screws. By releasably coupled, it is meant that the cutting element 122 may remain coupled to the backing plate 124 during normal operation of the stump grinder, but may be removed by a relatively simpler process compared with a cutting element 122 that is semi-permanently coupled to the backing plate 124. In an alternative embodiment, the backing plate 124 and/or cutting element 122 may be integrated into the mounting block 102. For example, the structure of the backing plate 124 may be integrated into the mounting block 102, and the cutting element 122 may be coupled directly to the mounting block 102.

The cutting element 122, backing plate 124, and/or mounting block 102 may be made of any suitable materials, such as steel and/or carbide. In some embodiments, the cutting element 122 may be a different material than backing plate 124 and/or mounting block 102. For example, the cutting element 122 may be made of carbide, and the backing plate 124 and/or mounting block 102 may be made of steel.

The cutting block 104 is coupled to the mounting block 102 by a pair of bolts 128 (only one is visible in FIG. 1) disposed in through-holes 130 of the mounting block 102 and receiving holes 132 of the cutting block 104 (on the backing plate 124). The mounting block 102 includes a guide structure 134 that engages with a slot 136 on backing plate 124 to provide further support for cutting block 104. The guide structure 134 is relatively straight along most of its length, and then flares outward at the base of the guide structure 134.

The wheel includes a first side surface 138 on a first side of the wheel 106 and a second side surface (not shown) on a second side of the wheel 106, opposite the first side. The wheel 106 defines a wheel plane between the first side surface 138 and the second side surface. The cutting edge 126 is continuous and extends from the first side of the wheel 106 (e.g., axially disposed from a first side surface 138 of the wheel 106) to the second side of the wheel 106 (e.g., axially disposed from the second side surface of the wheel 106) across the wheel plane. Accordingly, the cutting edge 126 may be used for cutting a workpiece (e.g., a stump) in three axes: plunging downward (e.g., perpendicular to the ground), sweeping sideways, and/or radially cutting forwards. The cutting edge may be relatively smooth (as shown in FIGS. 3A-3D) and/or may be serrated or include other structural features.

In various embodiments, the cutting edge 126 may have a length in the radial direction and a width in the axial direction. In some embodiments, the length may be different from the width (e.g., the width may be longer than the length or the length may be longer than the width). The oblong shape of cutting edge 126 may facilitate an increased depth of cut in the radial direction (for plunging and/or radial cuts) and/or increased width of the cutting edge 126 on the sides of the wheel 106 (e.g., for sweeping cuts). In other embodiments, the length of the cutting edge 126 may be the same as the width.

Figure 3A:
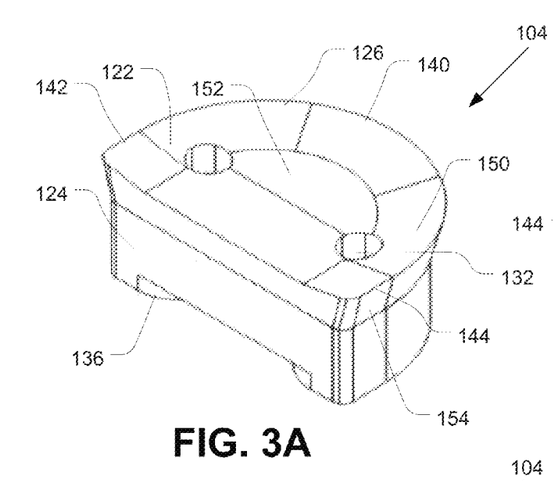
FIGS. 3A-3D illustrate various views of a cutting block in accordance with various embodiments, including: (A) a perspective view, (B) a top view, (C) a front view showing some internal structure, and (D) a side view showing some internal structure.
Figure 3B:
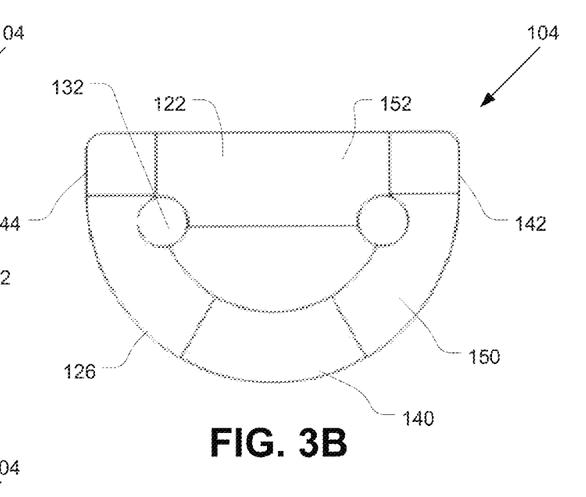
Figure 3C:
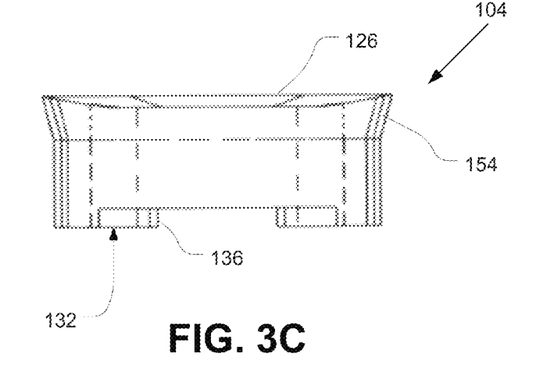
Figure 3D:
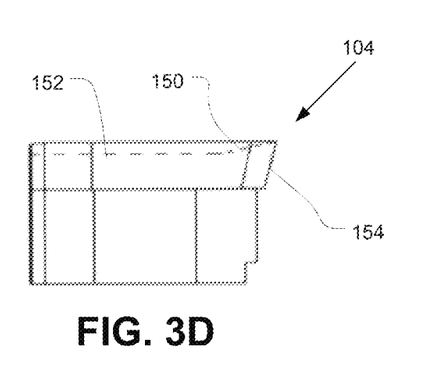
Figure 4A:
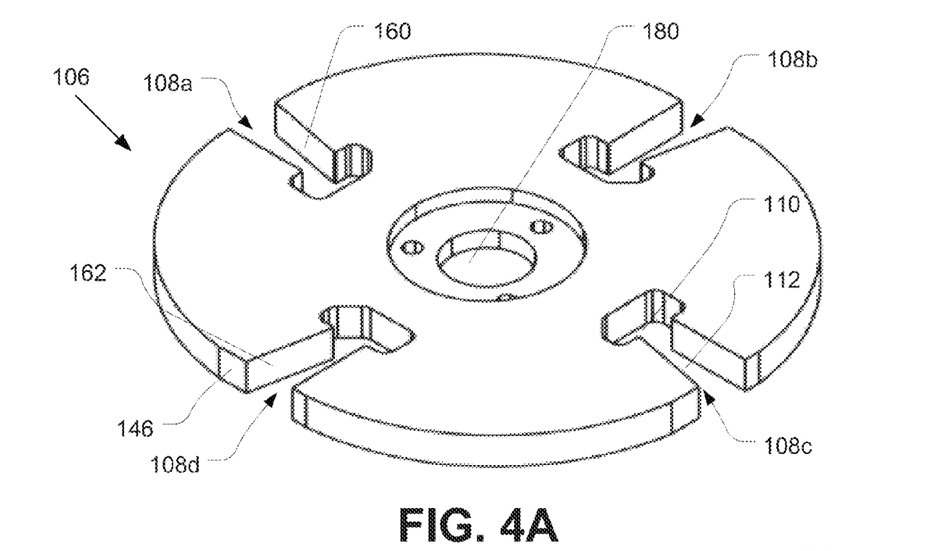
FIG. 4A illustrates a perspective view of a wheel in accordance with various embodiments.
Figure 4B:
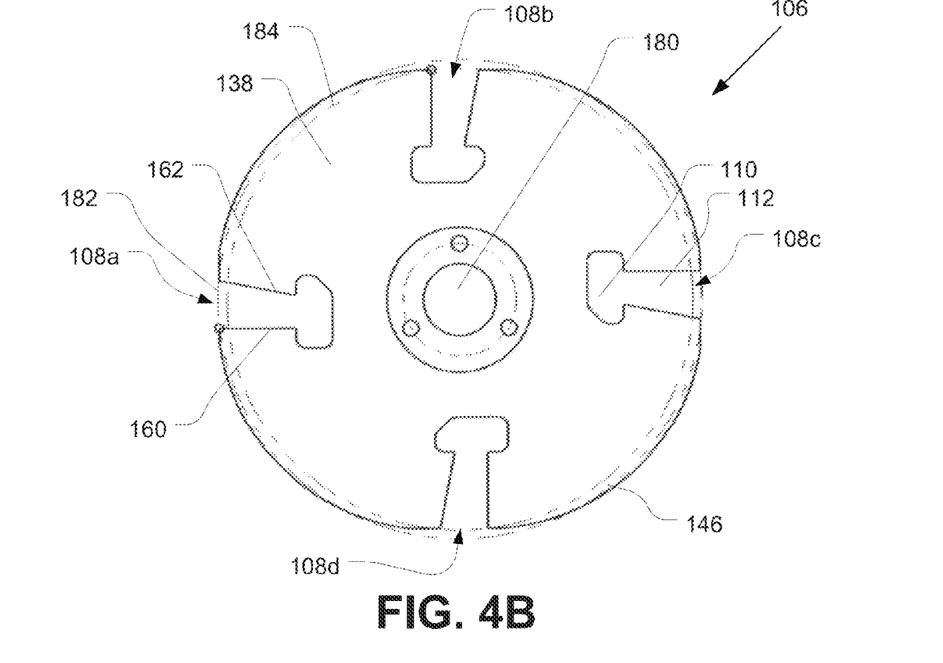
FIG. 4B illustrates a side view of a wheel in accordance with various embodiments.

In one embodiment, as best seen in FIGS. 3A-3B, cutting edge 126 includes a rounded portion 140 that crosses over the wheel plane, and straight portions 142 and 144 on either side of rounded portion 140. First straight portion 142 is disposed on the first side of the wheel 106 and second straight portion 144 is disposed on the second side of the wheel 108. Rounded portion 140 may be particularly useful for plunging and/or radial cuts, while straight portions 142 and 144 on the sides of the cutting edge 126 may be particularly useful for sweeping cuts.

In various embodiments, the cutting edge 126 extends a radial extension distance from a circumferential outer edge 146 of the wheel. The radial extension distance provides depth of cut in the radial direction for plunging (downward) and/or radial (forward) cuts. Additionally, the cutting edge 126 extends an axial extension distance from the side surfaces of the wheel (e.g., from the first side surface 138 of the wheel to the first straight portion 142 of the cutting edge 126). The axial extension distance may provide depth of cut in the axial direction for sweeping (sideways) cuts. In some embodiments, the radial extension distance may be longer than the axial extension distance. For example, the radial extension distance may be about 0.5 inches to about 3 inches, such as about 1 inch, and the axial extension distance may be about 0.1 inches to about 1 inch, such as about 0.25 inches. The relatively low axial extension distance may provide high rigidity for the cutting block 104 and/or mounting block 102, and/or may facilitate stability of the wheel 106.

In some embodiments, the cutting edge 126 may extend inward past the outer edge 146 of the wheel 106. For example, the first straight portion 142 of the cutting edge 126 may be disposed at least partially over the first side surface 138 of the wheel 106. In other embodiments, the cutting edge 126 may be entirely disposed radially from the outer edge 146 of the wheel 106.

In various embodiments, having the continuous cutting edge 126 and/or cutting block 104 across the plane of the wheel 106 may guard the bolt 118 and/or mounting block 102 from being hit by objects in the environment, such as chips, rocks, stumps, debris, and/or other objects. This may prolong the usable life of the mounting block 102 and/or bolt 118.

As shown in FIGS. 3A-3D, the cutting edge 126 may be formed by a slanted portion 150 that is angled with respect to a base portion 152 on the upper surface of the cutting element 122. In various embodiments, the angle of the slanted portion 150 with respect to the base portion 152 may be about 5 degrees to about 45 degrees, such as about 10 degrees.

An outside edge 154 of the cutting element may also be slanted inward from the cutting edge 126 to provide a clearance angle for clearing of chips from the stump.

In various embodiments, pocket 108 of the wheel 106 includes a first wall 160 and a second wall 162. The mounting block 102 includes a first slot 164 and second slot 166 that are disposed against the first wall 160 and second wall 162, respectively. The first slot 164 and second slot 166 are formed by side walls 168 and 170 of the mounting block 102. Side walls 168 and 170 of the mounting block 102 extend over the first and second walls 160 and 162 of the wheel 106 (e.g., past the side surfaces of wheel 106). Alternatively, in some embodiments, the first and second walls 160 and 162 may include guide structures that engage the first slot 164 and second slot 164, respectively, and the side walls 168 and 170 may be even with the side surfaces of the wheel 106.

The side walls 168 and 170 of the mounting block 102 also extend over the nut 114 to hold the nut in place in the bulbous bottom portion 110 of the pocket 108.

In various embodiments, the cutting block 104 may be easily coupled to the mounting block 108 with bolts 128. The cutting block 104 may be coupled to the mounting block 108 before or after the mounting block 108 is coupled to the wheel 106. In some embodiments, the cutting block 104 and/or cutting element 122 may wear out more quickly than the mounting block 102. In that case, the cutting block 104 may be removed and replaced with a new cutting block 104. The cutting block 104 may be replaced while the mounting block 102 remains coupled to the wheel 106. Additionally, the cutting block 104 may be replaced with a single tool. Accordingly, the cutting block 104 may be replaced quickly and easily. This may be particularly beneficial when replacement is desired at the job site where the stump grinder is being used.

Furthermore, the cutting block 104 is relatively small in size compared with the other components of the cutting system 100. Accordingly, it may be easier for the user to carry and/or store extra cutting blocks 104. Additionally, the small size may make it less expensive to manufacture, store, and/or ship cutting blocks.

As discussed above, in some embodiments, the cutting element 122 may be removed from the backing plate 124. In these embodiments, the cutting element 122 may be replaced and the same backing plate 124 may be reused if desired.

Additionally, as discussed above, the mounting block 102 engages both the first side wall 160 and second side wall 162 of the pocket 108, while the cutting block 104 does not engage the pocket 108. Accordingly, in some embodiments, only two surfaces (the slots 164 and 166) may need to be precisely machined to facilitate a tight fit of the mounting block 102 in the pocket 108.

In some embodiments, the cutting edge 126 may be oriented at a downward shear angle with respect to a radial line of the wheel 106 (e.g., angled in the direction of rotation of the wheel). In other words, the rounded radial portion 140 of the cutting edge may be lower than the straight side portions 142 and 144. The shear angle may facilitate shearing of the workpiece by the side portions 142 and 144 of the cutting edge 126. In some embodiments, the shear angle of the cutting edge 126 may be about 5 degrees to about 45 degrees, such as about 10 degrees, from a radial line through the center of the wheel 106.

In some embodiments, the pockets 108A-D may be oriented at an angle with respect to the center of wheel 106 to place the cutting edge 126 at the shear angle. Alternatively, or additionally, the cutting block 104 and/or mounting block 102 may be sloped to provide the desired shear angle for the cutting edge 126.

Figure 5:
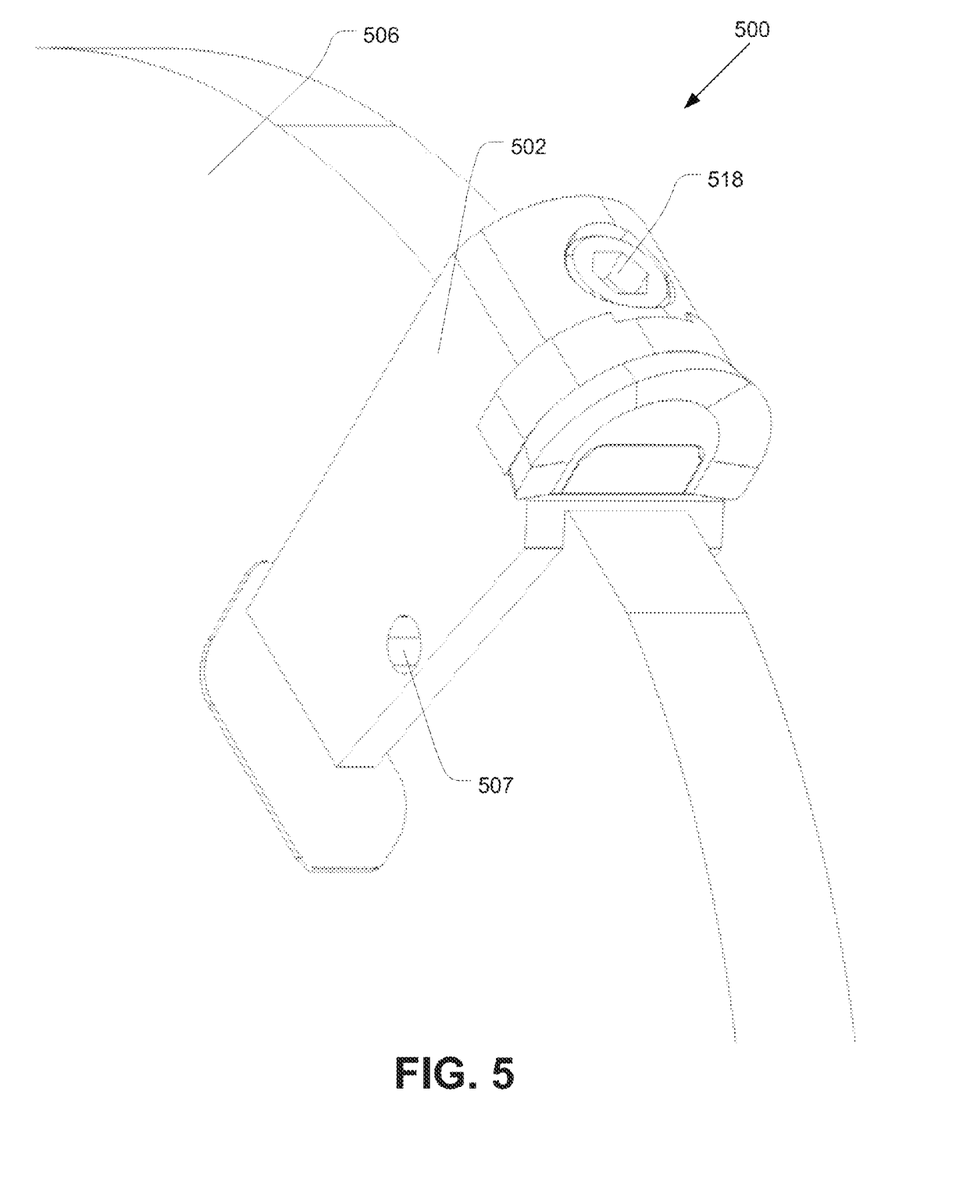
FIG. 5 illustrates a perspective view of a stump grinder cutting system including a safety mechanism in accordance with various embodiments.

FIG. 5 illustrates another embodiment of a cutting system 500 including a mounting block 502 coupled with a wheel 506 by a radial bolt 518. The mounting block 502 and wheel 506 are similar to the mounting block 102 and wheel 106 discussed herein, except that the mounting block 502 and wheel 506 include a backup safety mechanism to prevent the mounting block 502 from exiting the pocket in the event the radial bolt 518 breaks and/or fails. A safety pin (not shown) may be inserted in a hole 507 in the mounting block 502 and may interact with a safety feature of the wheel 506 to prevent the mounting block 502 from exiting the pocket. The safety feature of the wheel 506 may have any suitable structure. For example, the safety feature may be an indentation in the wall of the pocket and/or an axial hole in the side of the wheel. The safety mechanism may prevent the mounting block from being pushed radially out of the wheel if the bolt 518 breaks and/or fails. In some embodiments, the safety feature of the wheel 506 may allow some movement of the pin and/or mounting block 502 in the pocket of the wheel 506. Accordingly, the mounting block 502 may cause significant noise, such as a rattling noise, which may alert the user that there is a problem. Thus, the safety mechanism may prevent the mounting block 502 from exiting the pocket of the wheel 506, while also alerting the user to a problem with the bolt 518.

As shown in FIGS. 4A-4B, the wheel 106 includes a plurality of pockets 108a-d and a mounting hole 180 for mounting the wheel 106 to the stump grinder. A mounting block 102 and cutting block 104 may be coupled to the wheel 106 at each pocket 108a-d. The wheel 106 is oblong, as demonstrated in FIG. 4B by a first circle 182 and a second circle 184 that are concentric with the center of mounting hole 180. First circle 182 passes through the upper-left corner of pocket 108a and second circle 184 passes through the upper-left corner of pocket 108b. The oblong shape of wheel 106 may provide greater inertia for wheel 106 as it rotates.

Additionally, or alternatively, the oblong shape of the wheel 106 may facilitate having the cutting elements at neighboring pockets 108a-d on the wheel at different cutting depths (e.g., relative to the center of the wheel 106). In some embodiments, the wheel 106 may be configured to arrange the plurality of cutting elements at any suitable cutting depths relative to one another. The cutting elements may be placed at different cutting depths or at the same cutting depth. The wheel 106 may include other features, such as features of the pockets 108a-d, to facilitate the desired arrangement of the cutting elements.

In various embodiments, the rounded outer edge 146 of the wheel 106 may provide increased weight (and thereby increased moment of inertia) compared with an outer edge that has straight sides (e.g., a generally polygonal shape). The increased inertia may provide more efficient operation of the stump grinder. For example, the stump grinder may require less horsepower for similar productivity and/or may be capable of higher productivity for similar horsepower. Additionally, the increased inertia may allow the cutting element 122 to be used for a longer time (e.g., after the cutting edge 126 becomes dull).

Figure 6:
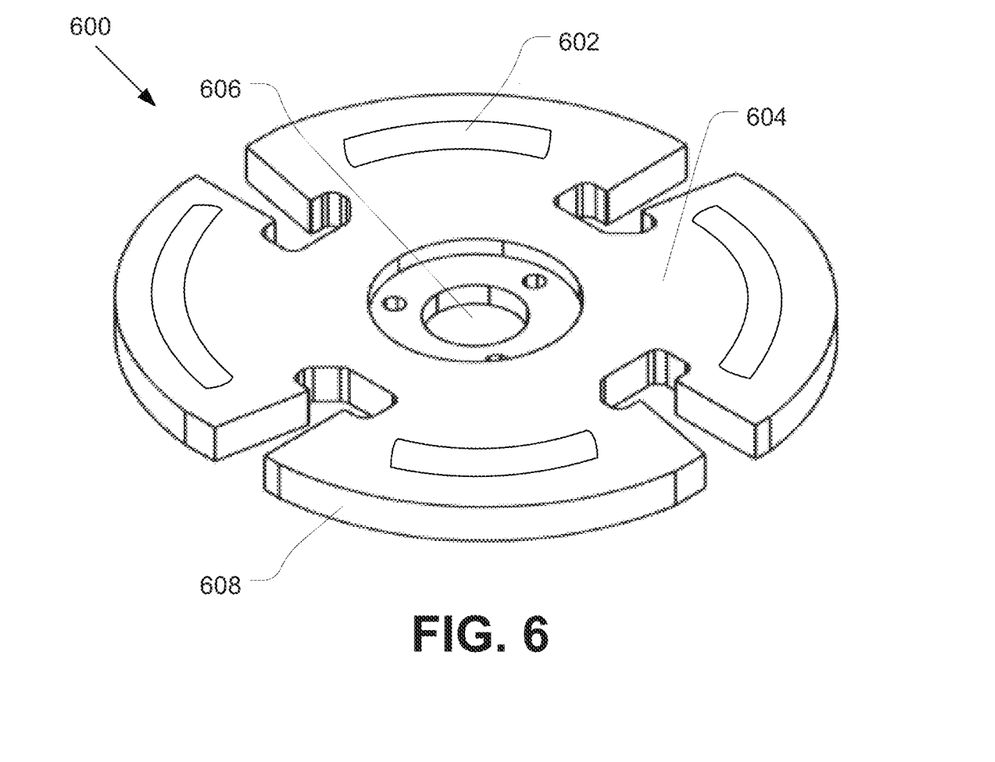
FIG. 6 illustrates a wheel with inset portions of a different material than a base material in accordance with various embodiments.
Figure 7A:
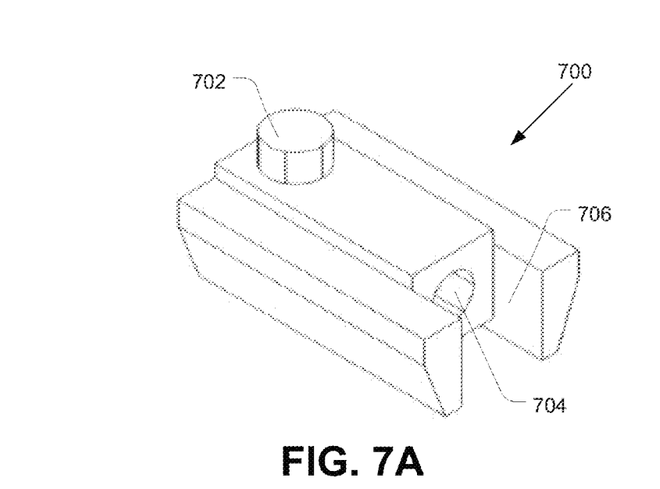
FIGS. 7A-7D illustrate various views of a mounting block in accordance with various embodiments, including: (A) a perspective view, (B) a side view, (C) a front view, and (D) a top view showing some internal structure.
Figure 7B:
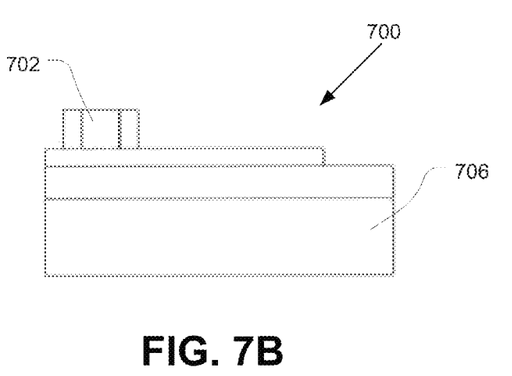
Figure 7C:
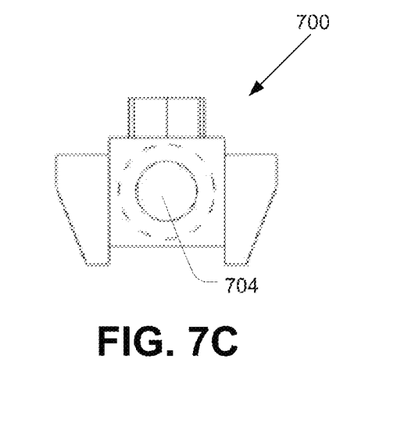
Figure 7D:
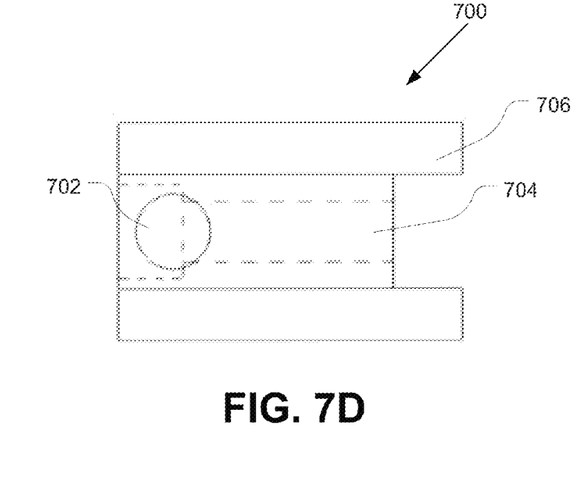
Figure 8A:
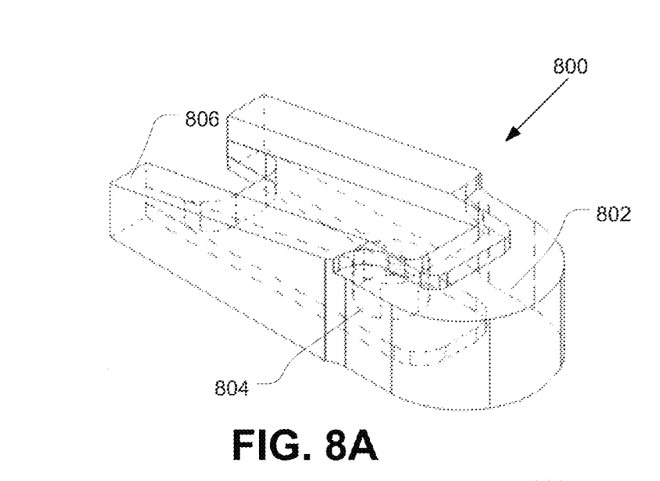
FIGS. 8A-8E illustrate various views of a cutting block in accordance with various embodiments, including: (A) a perspective view showing some internal structure, (B) a top view showing some internal structure, (C) a front view showing some internal structure, (D) a side view showing some internal structure, and (E) a perspective view with a cutting element attached.
Figures 8B, 8D:
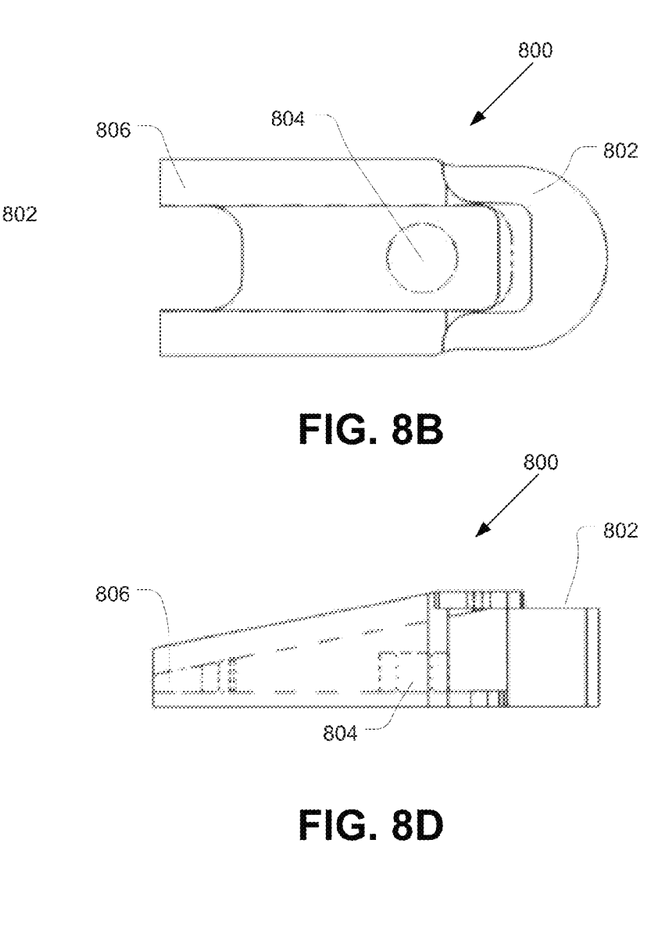
Figure 8C:
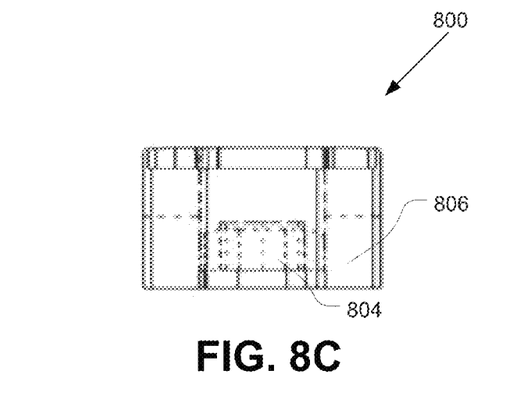
Figure 8E:
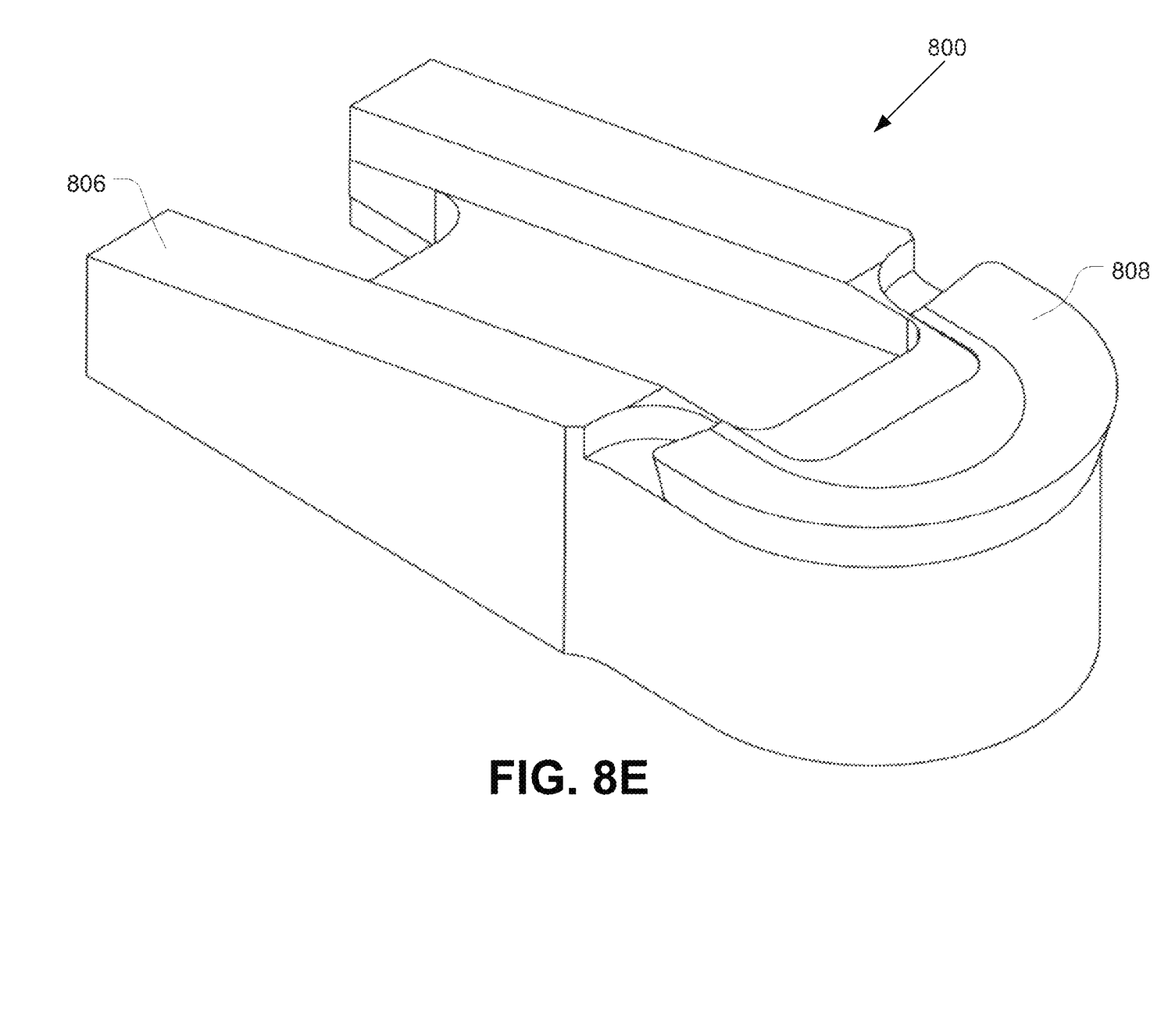

In some embodiments, the wheel 106 may include portions of a second material that is heavier than a base material of the wheel 106 to increase weight, and thereby provide increased inertia. For example, FIG. 6 illustrates a wheel 600 with inset portions 602 of an inset material that are inset into a base 604 of a base material. In various embodiments, the inset material may be heavier than the base material. For example, the inset material may be carbide, and the base material may be steel. The inset portions 602 may be arranged away from a center 606 of the wheel 600, toward an outer edge 608, to provide increased inertia. The wheel 600 may include any suitable quantity and/or arrangement of inset portions 602. The inset portions 602 may or may not be symmetrically arranged on the wheel 600.

FIG. 7 shows an alternative embodiment of a mounting block 700, and FIG. 8 shows an alternative embodiment of a backing plate 800, in accordance with various embodiments. The mounting block 700 and backing plate 800 may be used with the wheel 106 and nut 114 discussed above. A cutting element 808 may be coupled to the backing plate 800, as shown in FIG. 8E. The cutting element 808 may be coupled to a mounting surface 802 of the mounting block 700.

The backing plate 800 is coupled to the mounting block 700 with a peg 702 of the mounting block 700 disposed in a receiving hole 804 of the backing plate 800. The combined cutting assembly, including the mounting block 700 and backing plate 800, may be inserted into a pocket 108 of the wheel 106. A bolt (not shown) may be inserted through a through-hole 704 in the mounting block 700 to couple the mounting block 700 and backing plate 800 to the wheel 108. The mounting block 700 is disposed against the first side wall 160 of the pocket 108, and the backing plate 800 is disposed against the second side wall 162 of the pocket 108. The mounting block 700 includes a tail portion 706 that extends over the nut 116 to hold the nut in place in the pocket 108. Similarly, the backing plate 800 includes a tail portion 806 that extends over the nut 116.

The backing plate 800 may provide stability for the cutting element 808 by virtue of extending into the pocket 108. However, in some embodiments, the mounting block 700 may need to be removed from the pocket before the backing plate 800 and/or cutting element 808 may be replaced. The mounting block 700 and backing plate 800 may be precisely machined to facilitate a tight fit in pocket 108. The mounting block 700 and backing plate 800 may include four contacting surfaces between the side walls 160 and 162 of the pocket 108 (two each for the mounting block 700 and backing plate 800), compared with two contacting surfaces for the mounting block 102 discussed above. All of the contacting surfaces may need to be precisely machined to facilitate a tight fit in pocket 108.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A cutting assembly for a stump grinder, the cutting assembly comprising:
    a mounting block configured to be coupled to a wheel of the stump grinder, and including a first side wall and a second side wall that together define a slot, wherein when the mounting block is coupled to the wheel of the stump grinder, a portion of the wheel lies in the slot; and
    a cutting block coupled to the mounting block, and including a cutting edge that is continuous and extends from the mounting block's first side wall to the mounting block's second side wall and across the mounting block's slot, wherein the cutting edge includes:
        a rounded portion that extends across the mounting block's slot, and
        a straight portion that extends along the mounting block's first side wall.

2. The cutting assembly of claim 1, wherein the cutting block and mounting block are a unitary, integral piece.

3. The cutting assembly of claim 1, wherein the cutting block is releasably coupled to the mounting block.

4. The cutting assembly of claim 1, wherein the cutting edge is oriented relative to the mounting block to provide a shear angle of about 5 to about 45 degrees.

5. The cutting assembly of claim 1, wherein the cutting block includes a backing plate and a cutting element releasably coupled to the backing plate, wherein the cutting element includes the cutting edge.

6. The cutting assembly of claim 5, wherein the cutting edge also includes another straight portion that extends along the mounting block's second side wall.

7. The cutting assembly of claim 1, wherein the cutting edge extends a radial extension distance from an end of the mounting block's slot and an axial extension distance from the mounting block's first side wall, wherein the radial extension distance is longer than the axial extension distance.

8. The cutting assembly of claim 7, wherein the radial extension distance is about 0.5 inches to about 3 inches, and wherein the axial extension distance is about 0.25 inches to about 1 inch.

* * * * *